(Model.)

17 Sheets—Sheet 1.

M. L. NICHOLS.
GRAIN BINDER.

No. 423,267.

Patented Mar. 11, 1890.

WITNESSES
Franck L. Ourand
Jno. R. Young

INVENTOR
Marion L. Nichols
by Alex Mahon
Attorney (Model.)

M. L. NICHOLS.
GRAIN BINDER.

No. 423,267. Patented Mar. 11, 1890.

17 Sheets—Sheet 6.

WITNESSES
Franck L. Ourand
Jno. R. Young

INVENTOR
Marion L. Nichols
by Alex Mahon
Attorney (Model.)

17 Sheets—Sheet 7.

M. L. NICHOLS.
GRAIN BINDER.

No. 423,267. Patented Mar. 11, 1890.

WITNESSES
Franck L. Ourand
Jno. R. Young.

INVENTOR
Marion L. Nichols
by Alex Mahon
Attorney (Model.)

17 Sheets—Sheet 9.

M. L. NICHOLS.
GRAIN BINDER.

No. 423,267.

Patented Mar. 11, 1890.

WITNESSES
Franck L. Ouraud
Jno. R. Young.

INVENTOR
Marion L. Nichols
by Alex Mahon
ATTORNEY (Model.)

17 Sheets—Sheet 11.

M. L. NICHOLS.
GRAIN BINDER.

No. 423,267.    Patented Mar. 11, 1890.

WITNESSES
Franck L. Ourand,
Jno. R. Young.

INVENTOR
Marion L. Nichols
by Alex Mahon
ATTORNEY (Model.)
17 Sheets—Sheet 12.
M. L. NICHOLS.
GRAIN BINDER.
No. 423,267.
Patented Mar. 11, 1890.
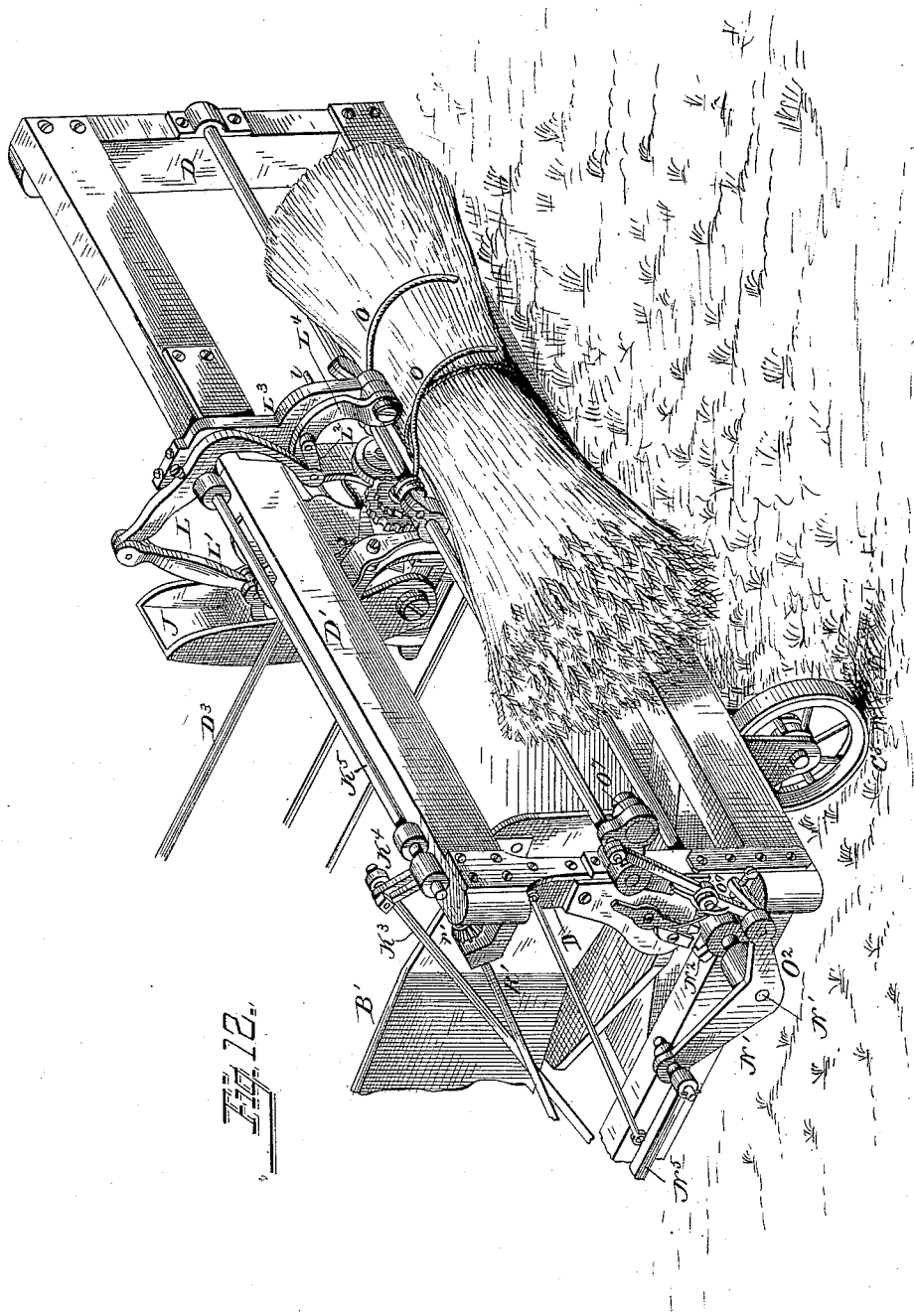
WITNESSES
F. L. Ourand
Jno. R. Young
INVENTOR
Marion L. Nichols
by Alex Mahon
Attorney (Model.)

17 Sheets—Sheet 13.

M. L. NICHOLS.
GRAIN BINDER.

No. 423,267.   Patented Mar. 11, 1890.

WITNESSES
Franck L. Ourand
Jno. R. Young

INVENTOR
Marion L. Nichols
by Alex Mahon
ATTORNEY

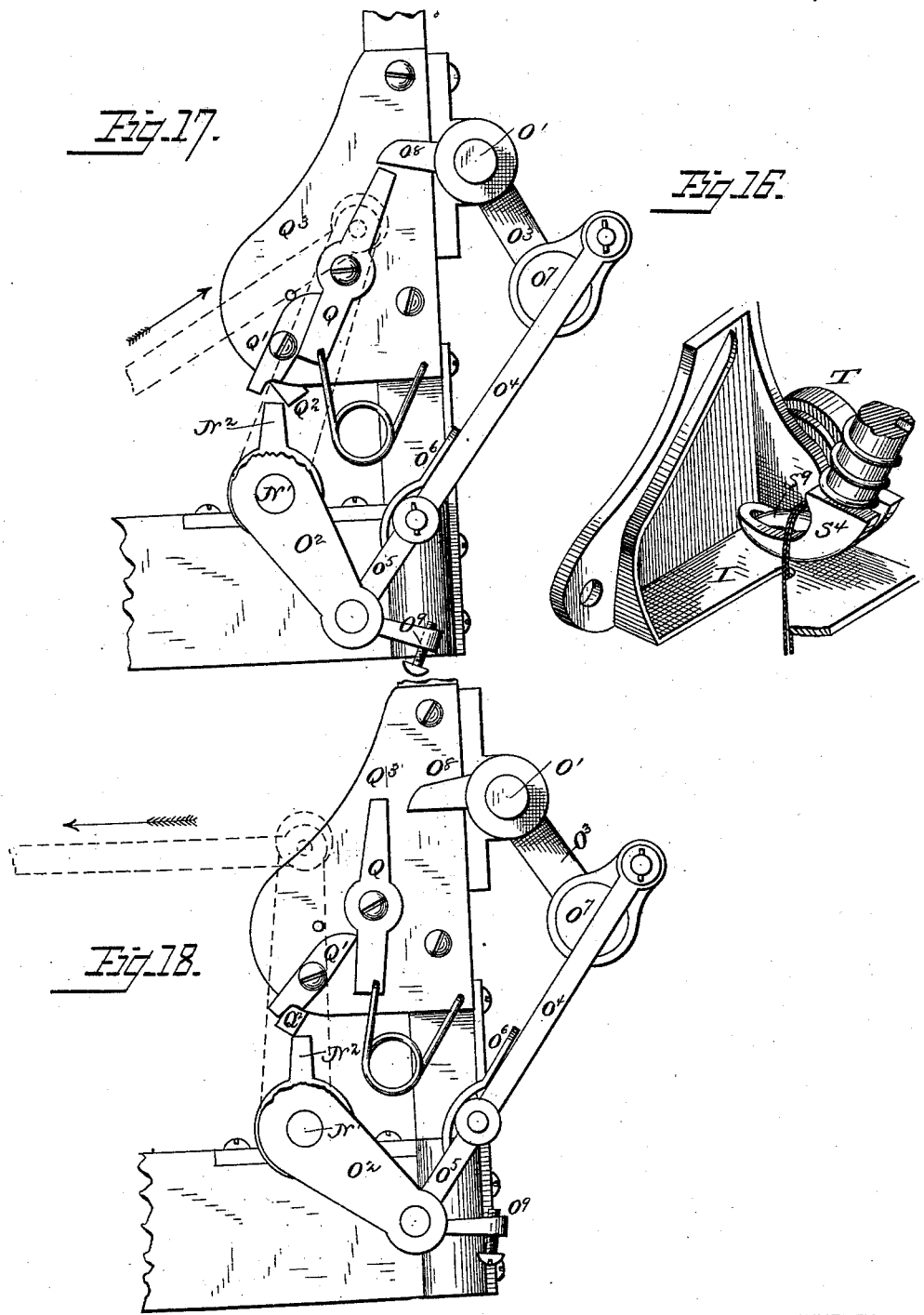

(Model.)

17 Sheets—Sheet 15.

M. L. NICHOLS.
GRAIN BINDER.

No. 423,267.

Patented Mar. 11, 1890.

WITNESSES
F. L. Ourand
Jno. R. Young.

INVENTOR
Marion L. Nichols
by Alex Mahon
ATTORNEY (Model.)

M. L. NICHOLS.
GRAIN BINDER.

No. 423,267.

17 Sheets—Sheet 16

Patented Mar. 11, 1890.

WITNESSES
Franck L. Ourand.
Jno. R. Young.

INVENTOR
Marion L. Nichols
by Alex Mahon
ATTORNEY (Model.)

17 Sheets—Sheet 17.

M. L. NICHOLS.
GRAIN BINDER.

No. 423,267.  Patented Mar. 11, 1890.

WITNESSES
Franck L. Ourand
Jno. R. Young.

INVENTOR
Marion L. Nichols
by Alex Mahon
Attorney

UNITED STATES PATENT OFFICE.

MARION L. NICHOLS, OF BATAVIA, ASSIGNOR TO THE NICHOLS HARVESTER COMPANY, OF NEW YORK, N. Y.

GRAIN-BINDER.

SPECIFICATION forming part of Letters Patent No. 423,267, dated March 11, 1890.

Application filed March 23, 1883. Serial No. 39,266. (Model.)

*To all whom it may concern:*

Be it known that I, MARION L. NICHOLS, of Batavia, county of Genesee, State of New York, have invented certain new and useful Improvements in Grain-Binders, of which the following is a specification, reference being had to the accompanying drawings, making part thereof, in which—

Figure 1:
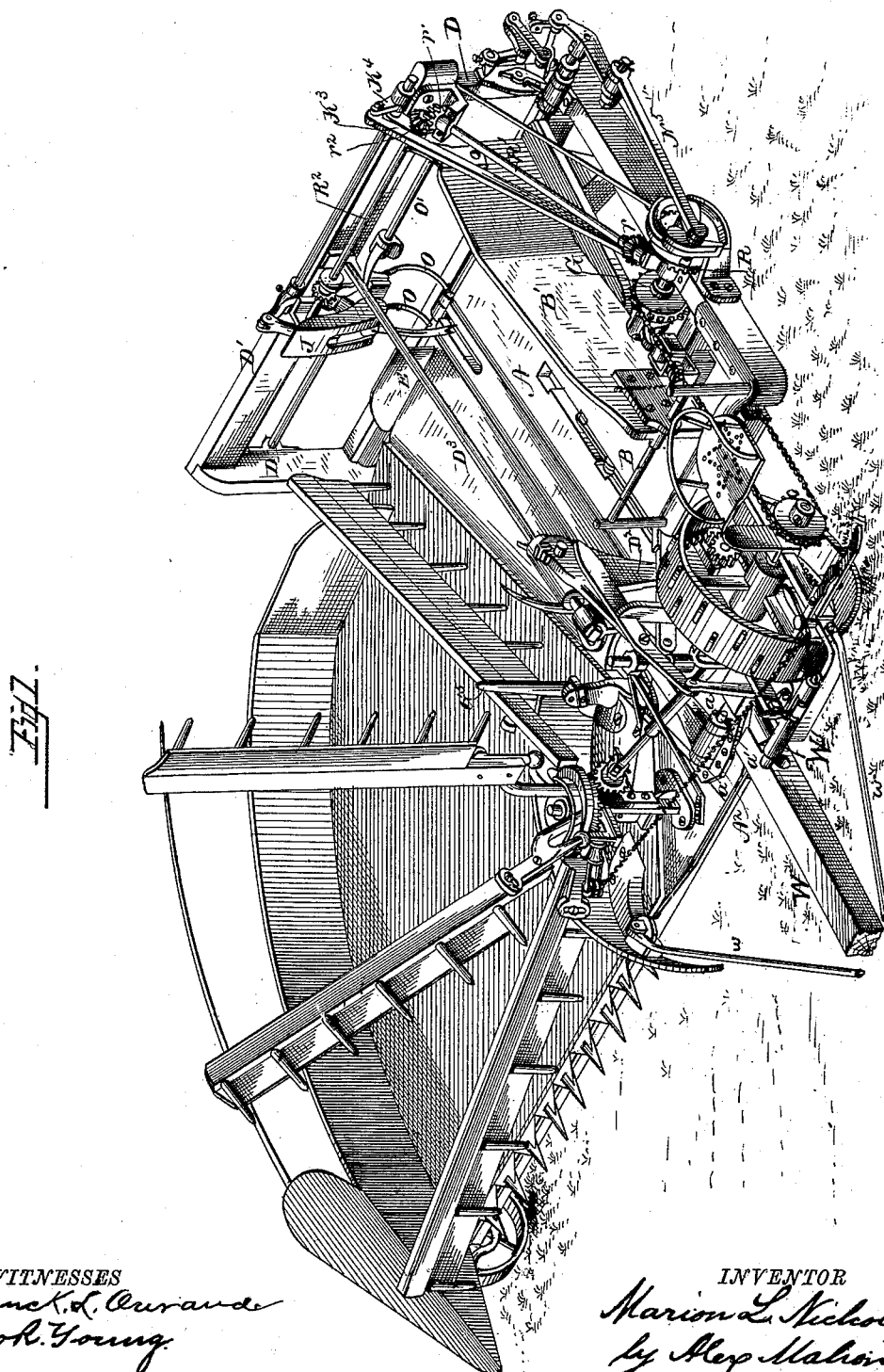
Figure 2:
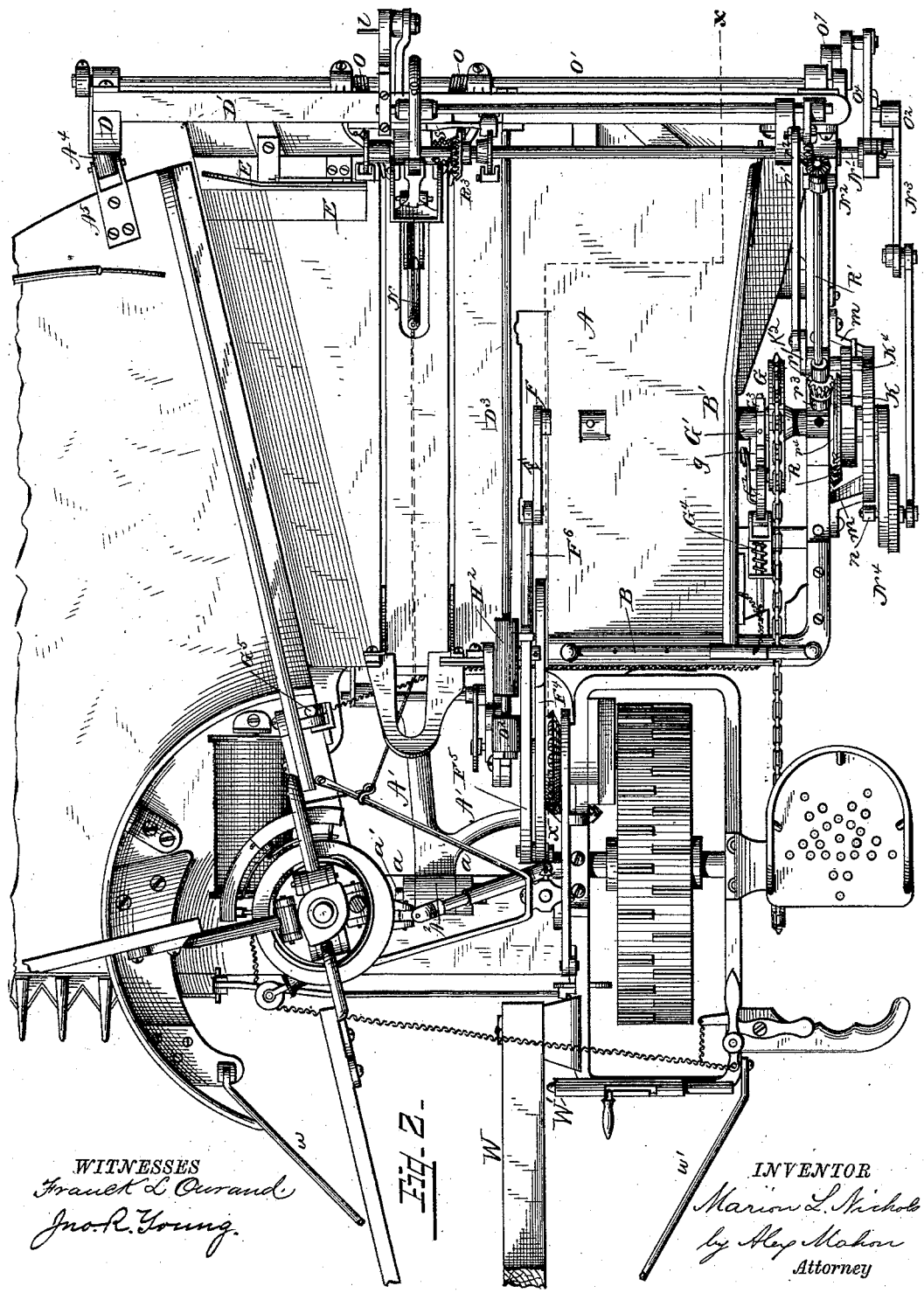
Figure 3:
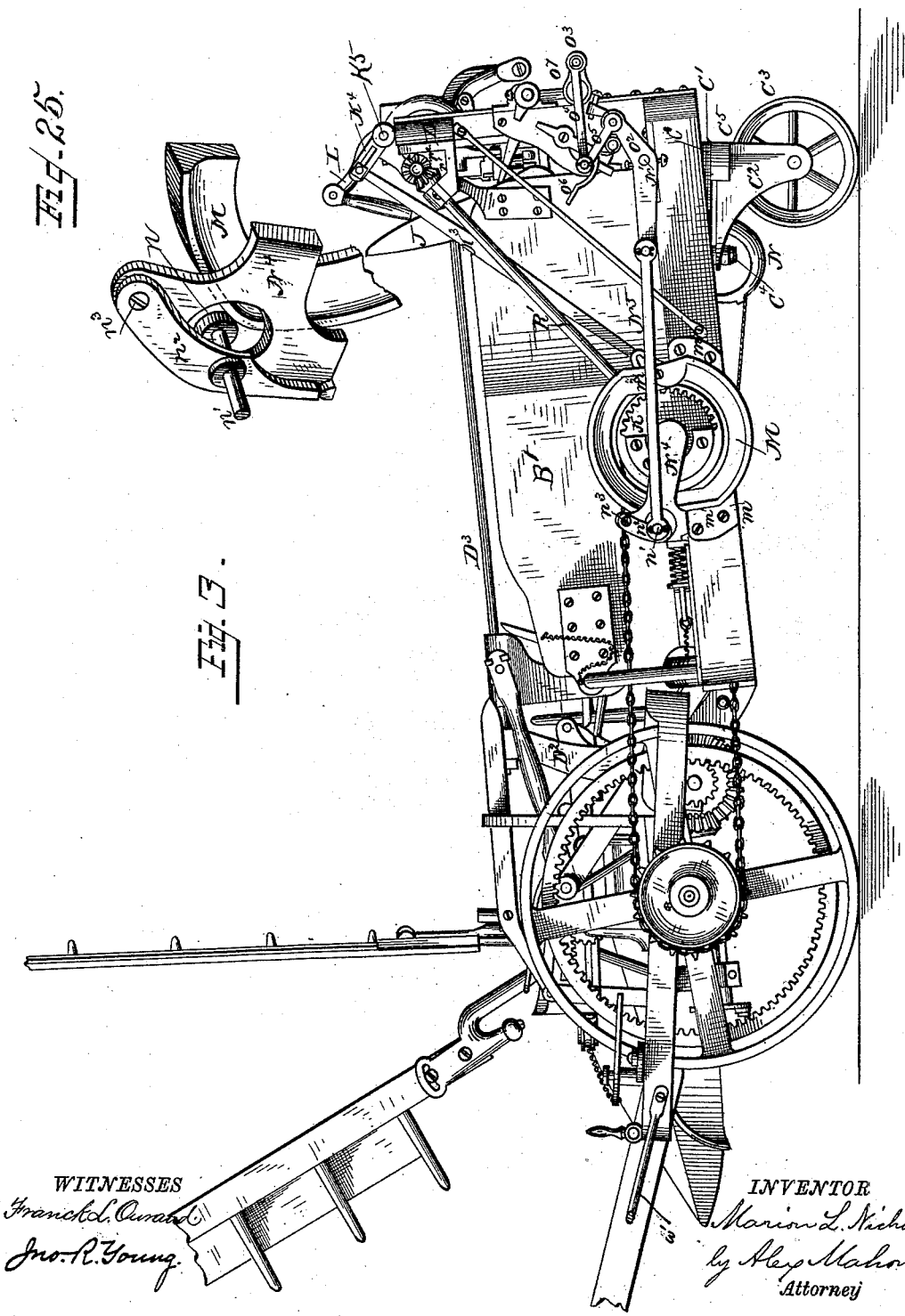
Figure 4:
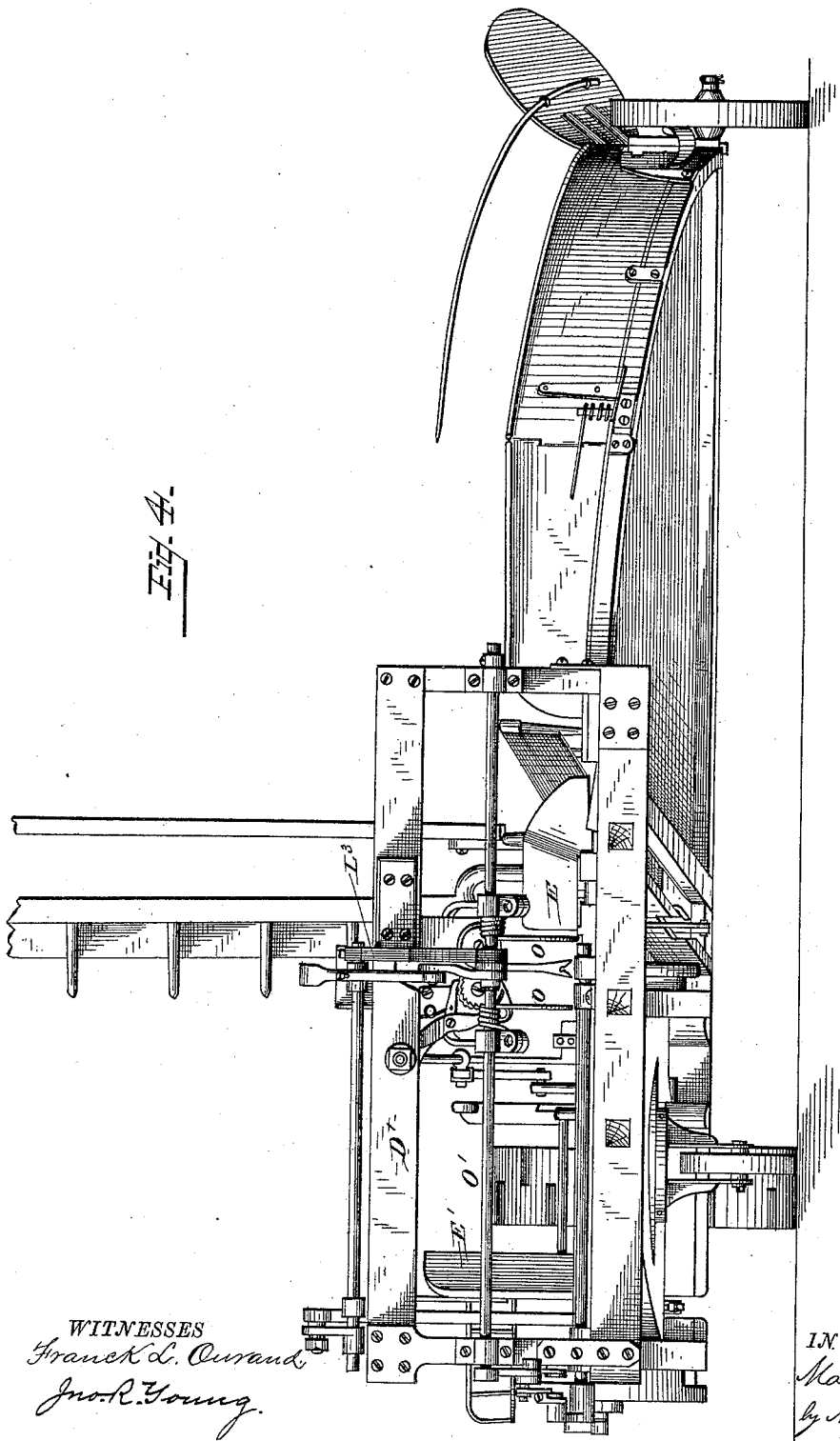
Figure 5:
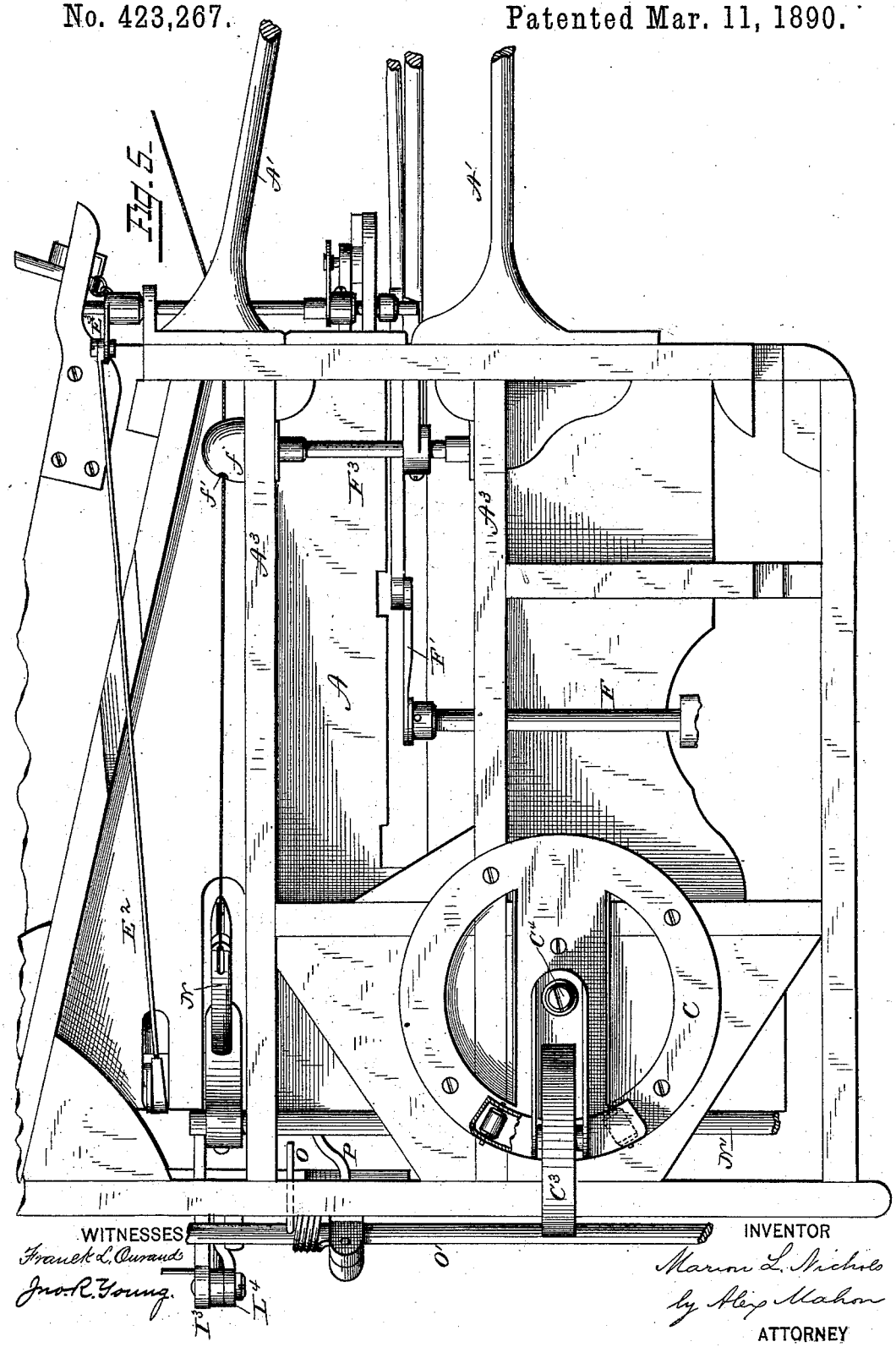
Figure 6:
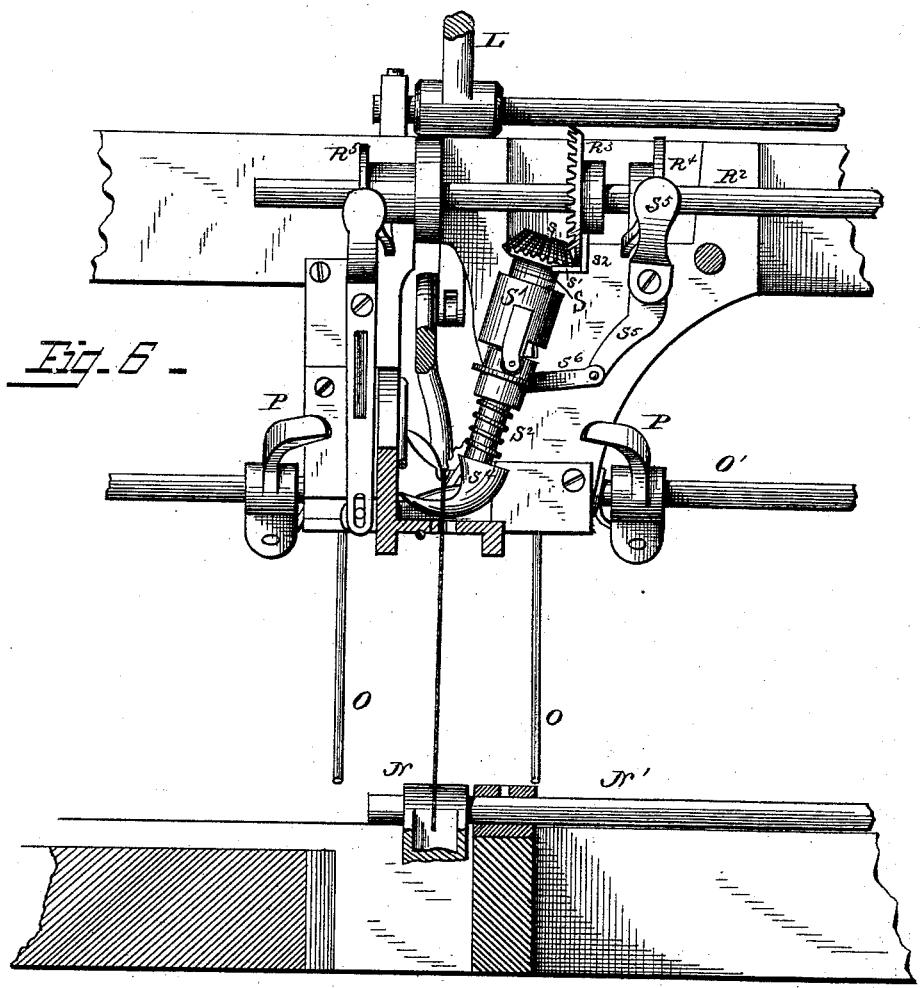
Figure 7:
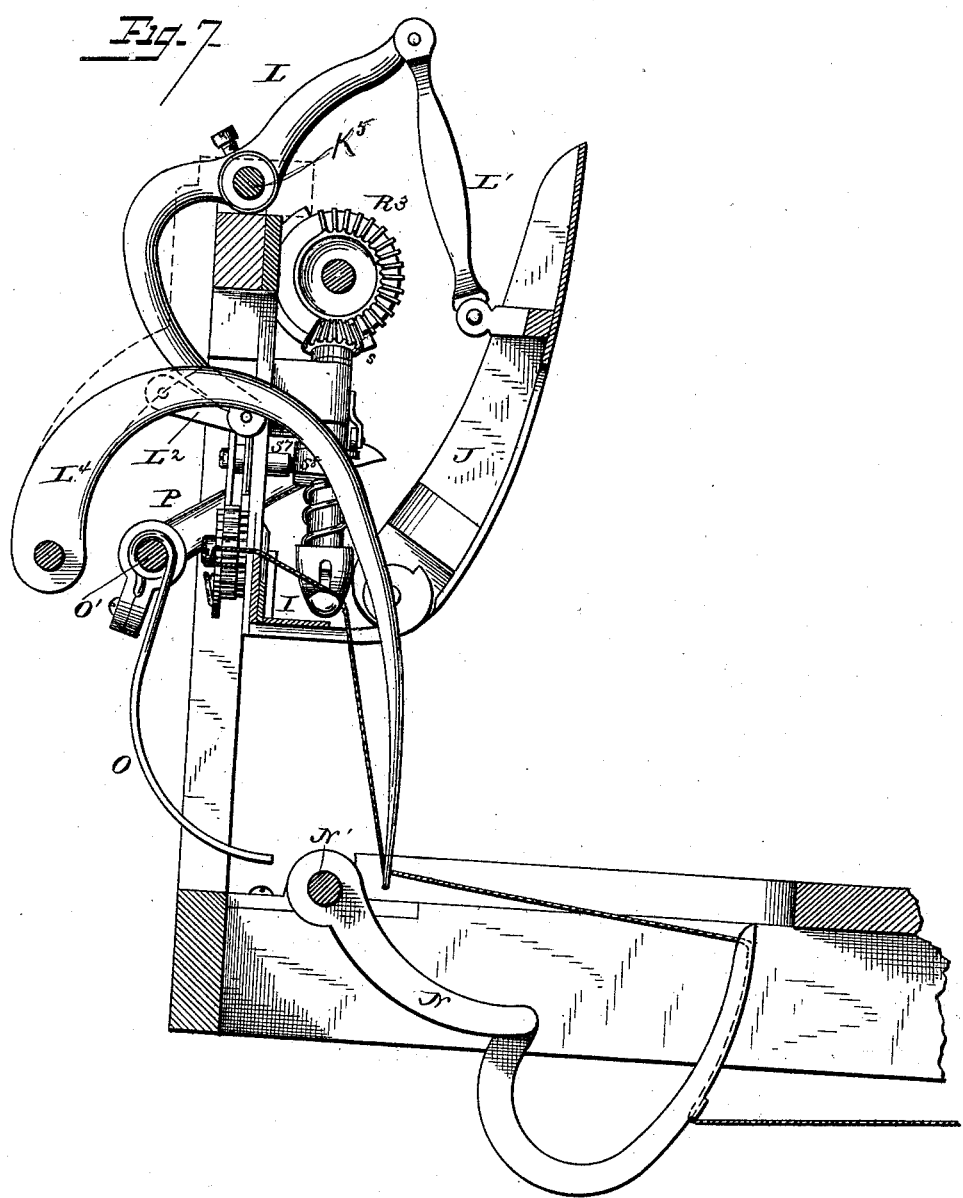
Figure 8:
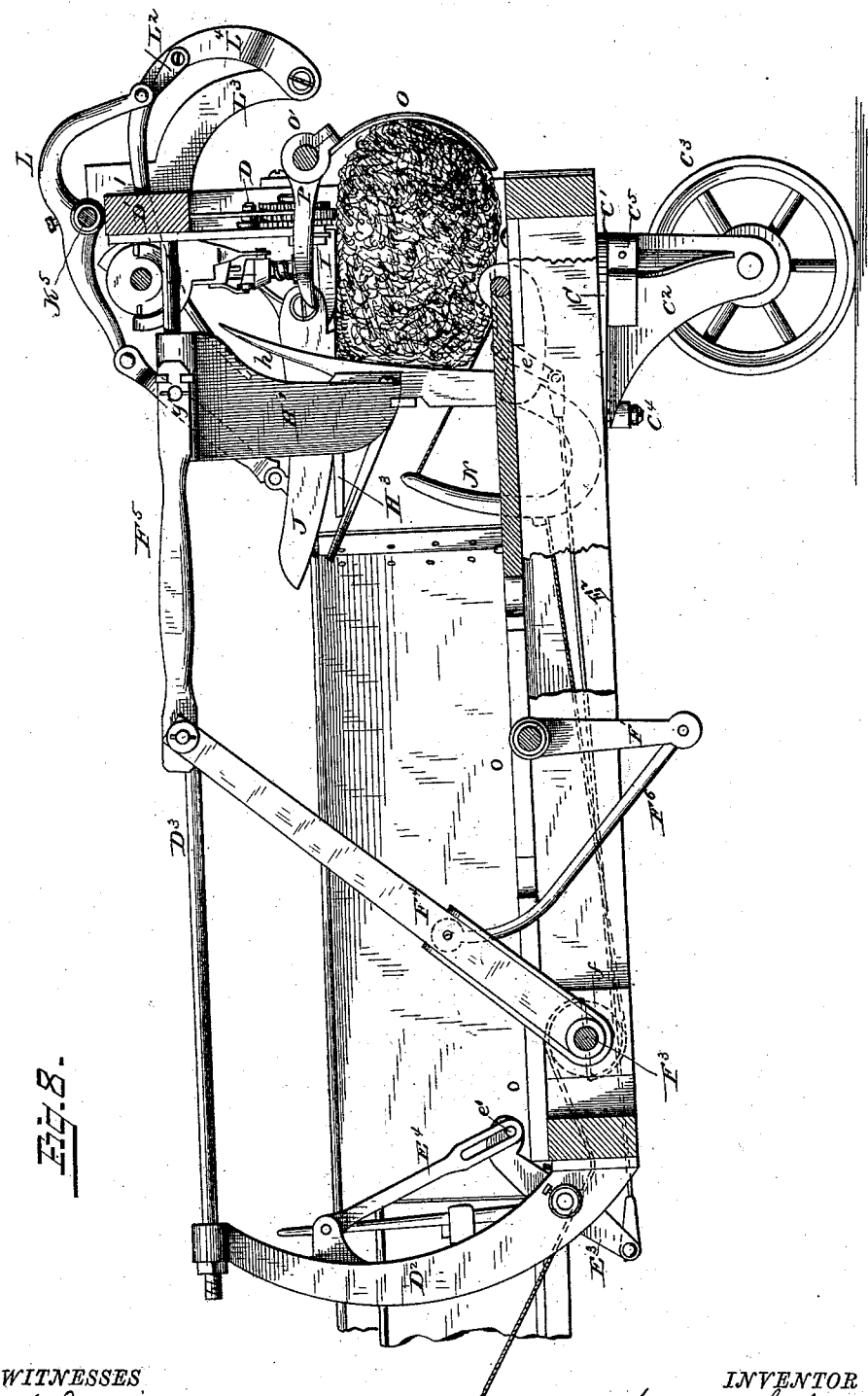
Figure 9:
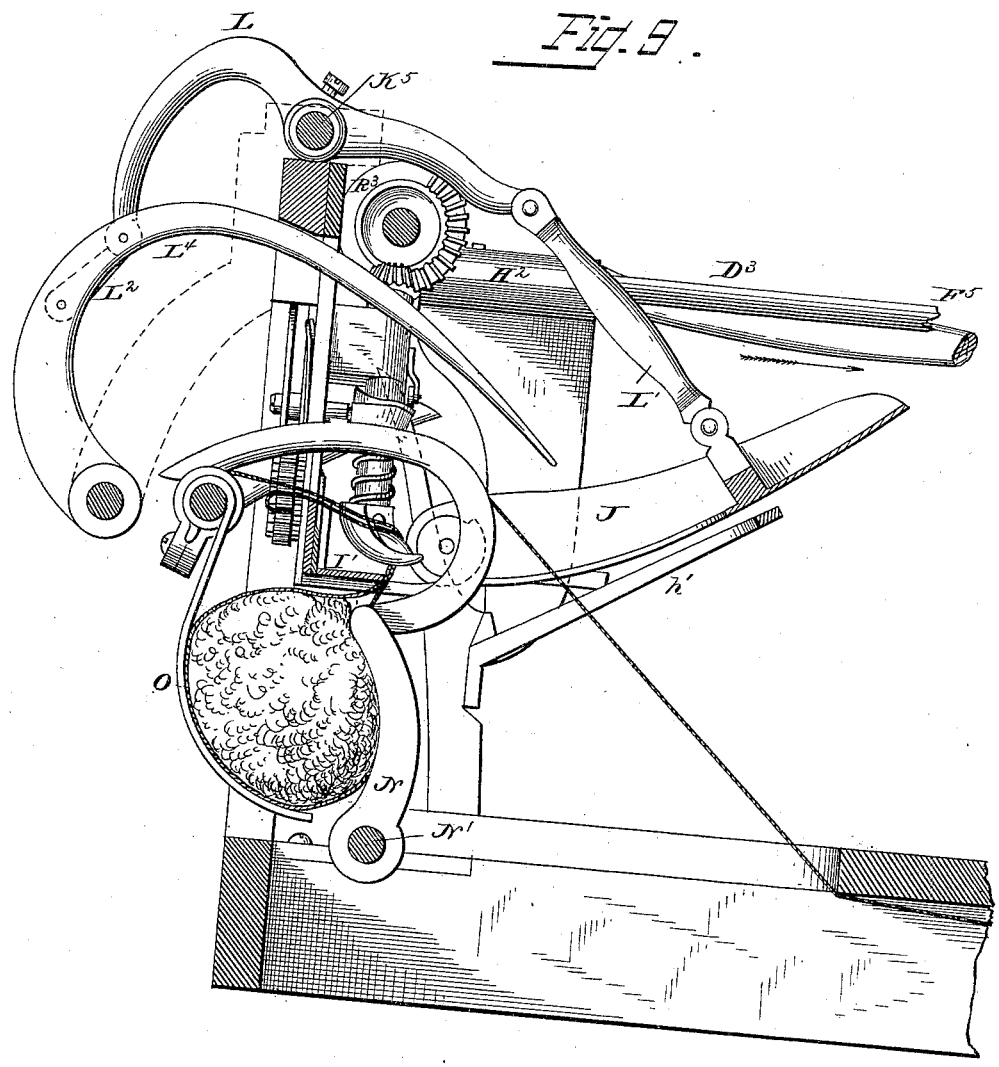
Figure 10:
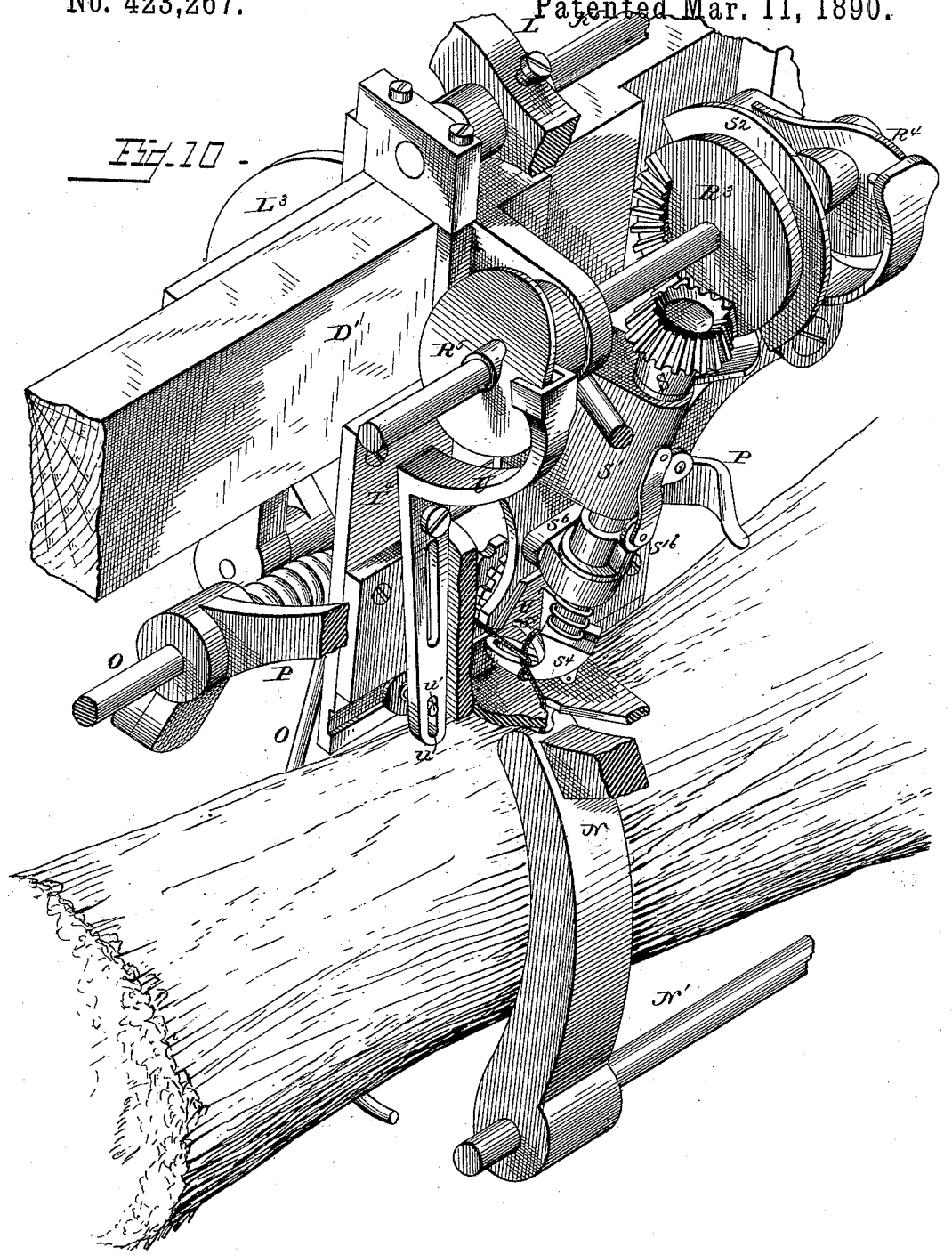
Figure 11:
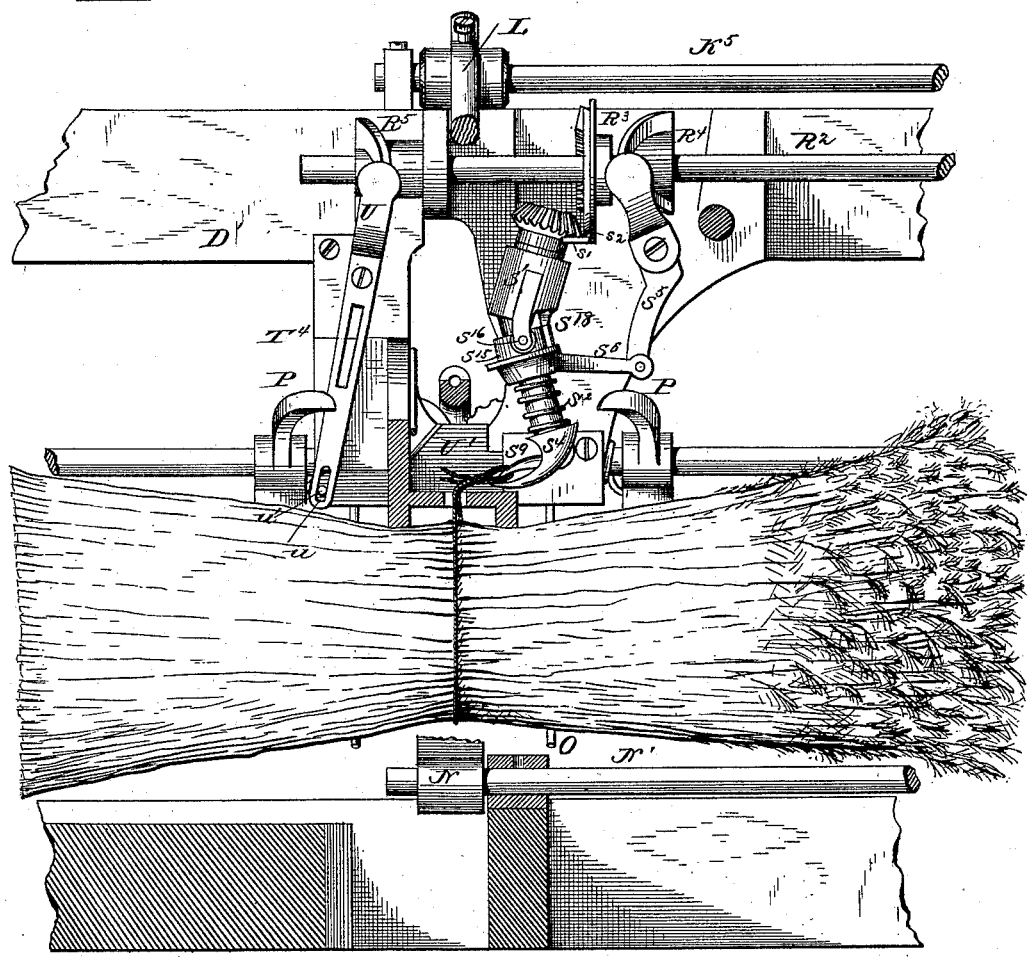
Figure 14:
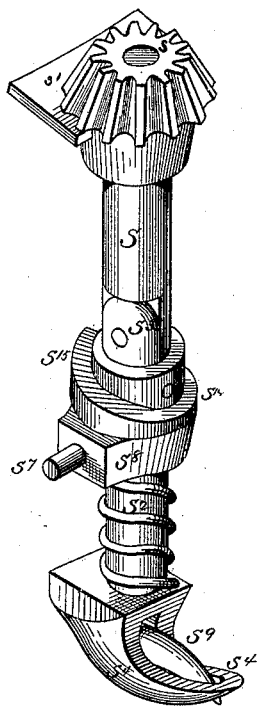
Figure 13:
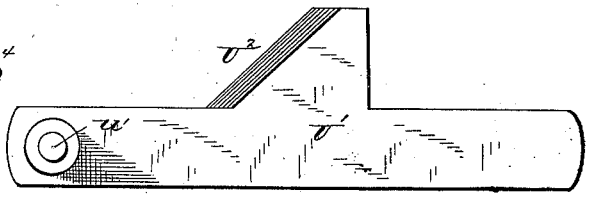
Figure 15:
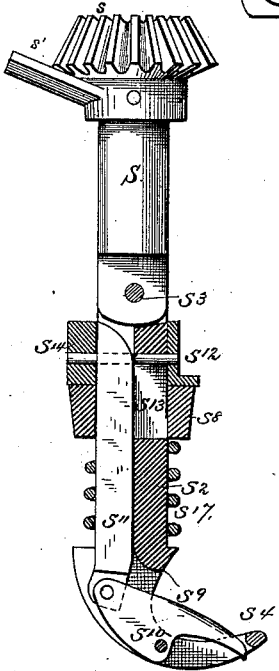
Figure 19:
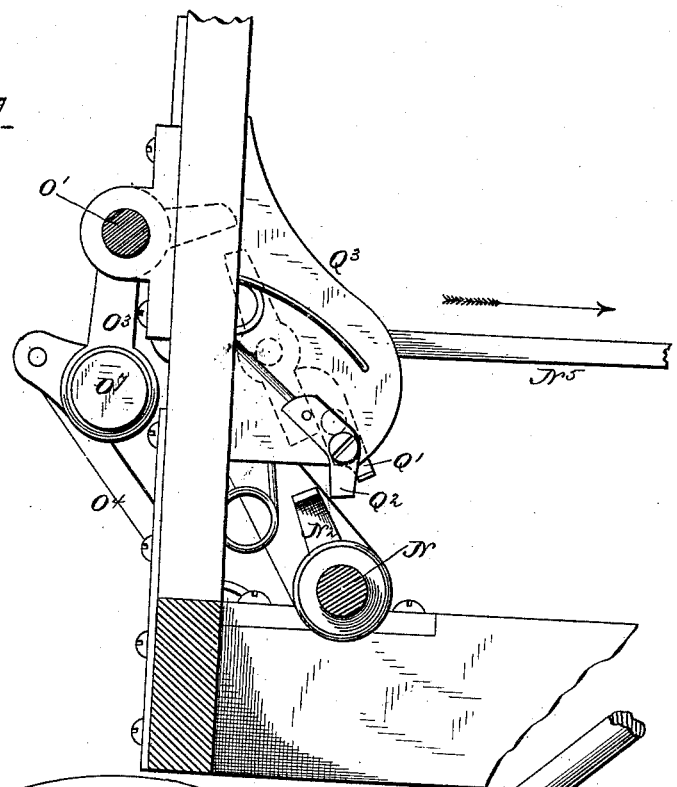
Figure 20:
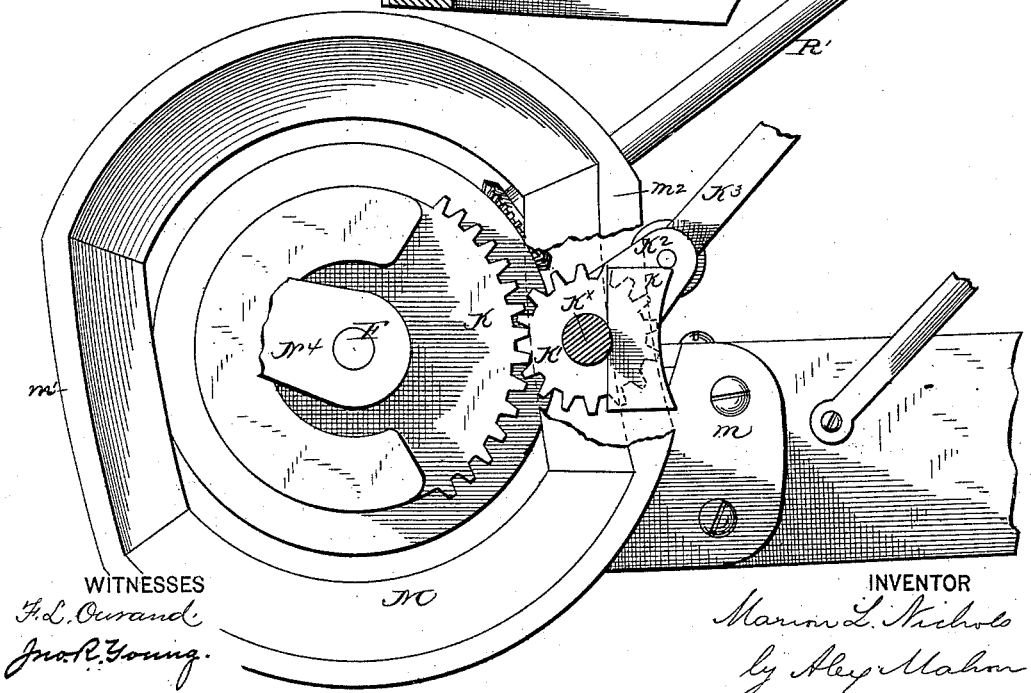
Figure 21:
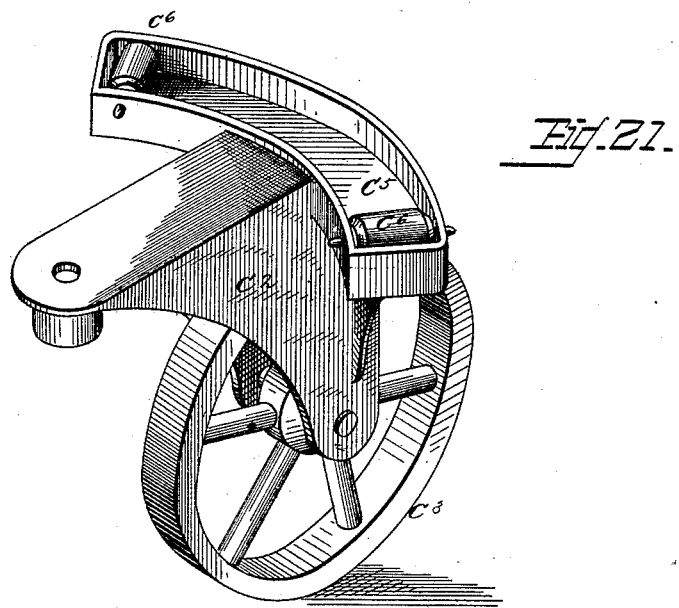
Figure 22:
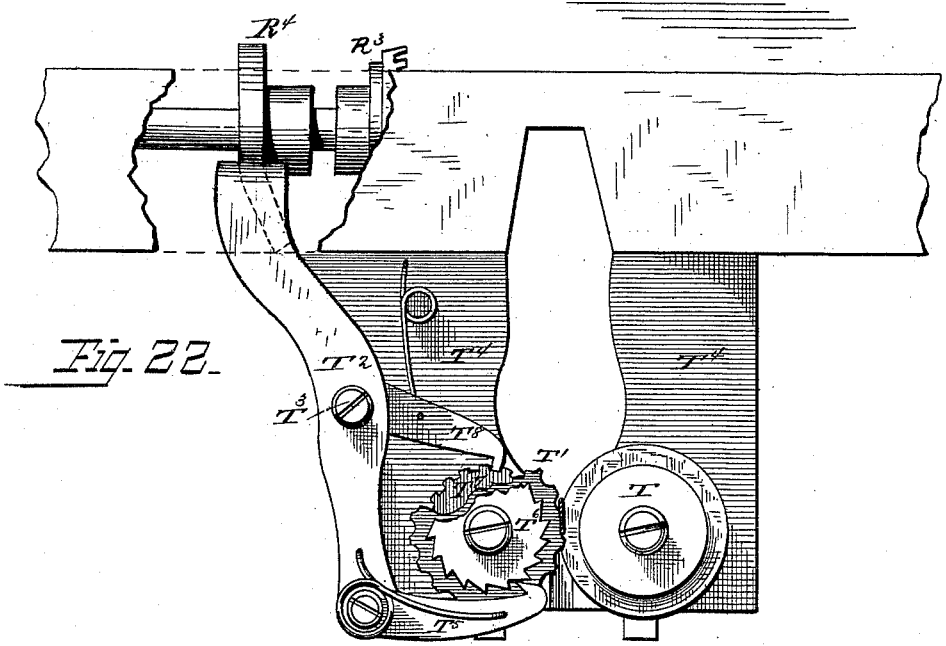
Figure 23:
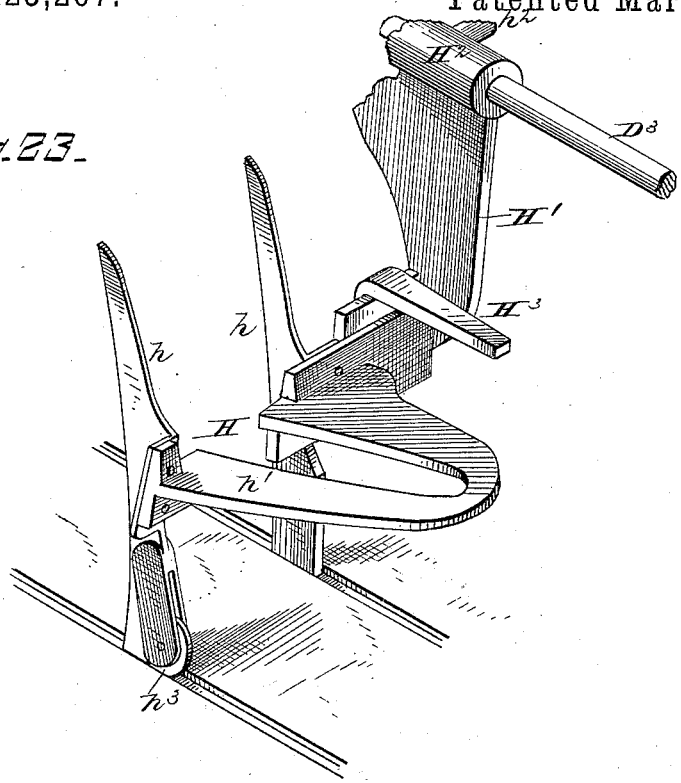
Figure 24:
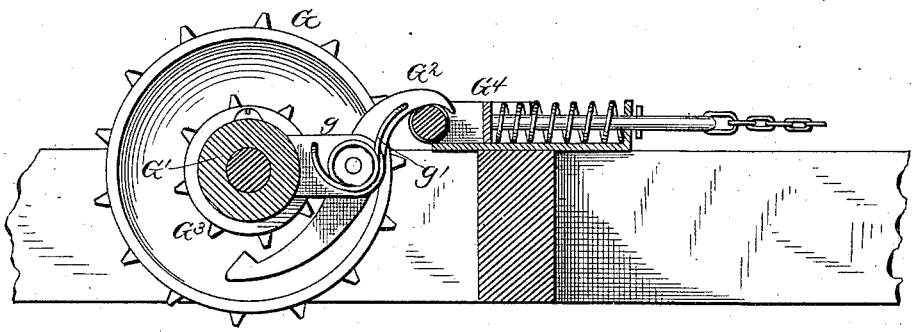

Figure 1 is a perspective view of a self-raking reaper, showing my improved binder applied thereto. Fig. 2 is a plan or top view of the same, showing the reaper-platform broken away. Fig. 3 is a side view of the same, taken from the stubble or master-wheel side. Fig. 4 is a rear view. Fig. 5 is a bottom view of the binder. Fig. 6 is a front or inner view of the knotting device, the rear compressors and ejectors being in their position of rest and some of the co-operating parts being in section. Fig. 7 is a side sectional view of the same parts, showing also the knotter-shield, cord-depressor, and needle. Fig. 8 is a sectional view of the binder, taken on the line *x x*, Fig. 2. Fig. 9 is a side sectional view showing the grain compressed and the knotter in the first stage of action. Fig. 10 is a sectional perspective showing a still further action of the knotter, with the upper jaw open to receive the cord. Fig. 11 is a front or inner view of the knotting device, some of the co-operating parts being in section, showing the knot fully formed and the knotter as swung back to tighten and discharge the knot. Fig. 12 is a rear or outer sectional perspective of the binder, showing the ejectors discharging the sheaf. Fig. 13 is a front view of the knife. Fig. 14 is a perspective view of the knotter; and Fig. 15 is a side view of the same, partly in section. Fig. 16 is a perspective sectional view of the stationary cord-guide, to which the moving shield is pivoted, showing a portion of the knotter and its relation thereto. Fig. 17 is a side view of the spring locking-dog and trip, showing the operation of the lug upon the needle-shaft, passing the trigger or trip in its forward movement. Fig. 18 is a similar view showing the return movement of the lug operating upon the trips of the locking dog or detent to move said locking dog or detent out of the way to permit the discharge of the sheaf. Fig. 19 is a reverse view showing said devices from the opposite side. Fig. 20 is a side or face view of the stationary track, showing the pinion for operating the shaft of the shield and cord-depressor, also the knotter-operating gear. Fig. 21 is a perspective view of the bracket and wheel for supporting the binder-platform. Fig. 22 is a rear or outer view of the cord-gripper and the pawls and lever for operating the same, partly in section. Fig. 23 is a perspective view of the compressor; and Fig. 24 is a side view of the sprocket-wheel, ratchet-wheel, spring-dog, and sliding bolt for throwing the binder into and out of action. Fig. 25 is a view of a section of the stationary cam-track, showing the slotted crank-arm, swinging link, and the friction-roller for engaging the cam-track.

My invention relates to that class of grain-binders employing cord or twine as the binding material, and in illustrating and describing one manner of operating the devices the same are shown as particularly applicable to a reaper employing a revolving rake; and the invention consists in a novel manner of connecting the binding-platform to the main frame and platform of the reaper; to a novel manner of supporting the rear end of the binding-platform; to a novel device for throwing the binding mechanism into and out of action; to a novel construction of fender-board for guiding the grain past the cord or twine as swept in by the rake; to a novel construction of grain arrester and shield; to a novel construction of tension devices; to a novel construction of gatherer and compressor; to a novel construction of shield for the knotting device, forming an upper compressor; to a novel construction of knotter; to a novel manner of operating the knotter, and also the knife for cutting the cord or twine; to a novel manner of operating the rear compressors and the ejectors; to a novel manner of operating the needle and compressor; to a novel construction of cord or twine depressing arm; to a novel construction of cord-gripping device, and to a novel manner of operating the same, and to certain details in the construction and arrangement of parts hereinafter explained.

In the accompanying drawings the binder and the mechanism for imparting motion thereto, as before stated, are shown as particularly applicable to a revolving self-raking reaper, and in describing said binding mechanism the raking and driving mechanism thereof will only be described so far as they enter into and form a part of the combinations herein claimed.

The binder-platform A is made in quadrilateral form, having its inclined edge to conform to the discharge end of the quadrant-shaped reaper-platform. This binder-platform at its forward end is provided with a projecting fork or draft-brace A', rigidly connected to said platform and provided with a transverse bearing-block, as shown at $A^2$, which fits between two lugs or ears $a$ $a$, secured to the main frame of the reaper, and being secured therein by means of a rod or bolt $a'$, as shown.

The rear transverse brace of the binder-platform is projected beyond the inclined side, and is provided with a projecting lug or block $A^4$, which is adapted to fit between and be secured to a plate or bearing-block $A^5$, rigidly connected to the rear end of the quadrant platform by means of a transverse rod or bolt, as shown. By this arrangement it will be seen that while the binder-platform is adapted to be readily connected with or disconnected from the reaper-platform, at the same time, when so connected, the binder-platform will be rigid with the reaper-platform and main frame, and will thereby be adapted to rise and fall therewith in raising and lowering the cutters. This platform on its under side, near the rear edge, is provided with a circular plate or disk C, made tapering, as shown at C' in Figs. 3 and 8. This plate forms a track for the bracket of the supporting-wheel $C^3$, hereinafter described.

The bracket $C^2$ is made in triangular shape, as shown in Figs. 3, 8, and 21, and is provided at its lower end with a transverse bearing for the axle of the supporting-wheel $C^3$. The upper forward end of this bracket is provided with a bearing, by means of which it is connected to the pivot-pin or axle $C^4$, formed with or attached to the track C, and upon which axle said bracket, and with it the wheel, is adapted to turn. This bracket is provided on its rear upper edge with a segmental groove or trough $C^5$, in which is mounted a series of friction wheels or rollers $C^6$, which roll upon the circular disk or track C, before referred to. By this construction and arrangement of supporting-wheel it will be seen that the weight of the platform is taken from off the pivot and is brought directly over the axle of the supporting-wheel, which permits the bracket to turn easily upon the pivot without cramping. It will also be seen that by inclining the track, as above described, the entire bearing-surface of the track is brought in a horizontal line, which arrangement also prevents the cramping of the parts in turning the machine. The rear end of this platform is provided with vertical end timbers D, connected by a transverse horizontal frame-timber D' at their upper ends, which together form the supporting-frame for the binding mechanism, hereinafter described. This supporting-frame is securely braced from the forward end of the platform by means of an upright standard $D^2$, bolted to the face of the front binder-frame timber, and by means of a longitudinal brace $D^3$, extending from its upper end to the horizontal frame-timber D'.

Having described the frame of the machine, I will next proceed to describe the apparatus for delivering the grain upon the binder-platform in proper position to be operated upon by the binder mechanism.

A fender-board E is employed for guiding the grain endwise past the cord and cord-depressing arm to prevent said grain from being entangled with or thrown on the table outside of the cord. This fender-board E is held in its vertical position to direct the grain by means of rods or links operated upon by the front reciprocating compressor, and is released to permit the discharge of the bundle by the forward movement of said compressor, in the manner hereinafter described.

Arranged upon the front portion of the binder-platform is a rod or guide B, upon which is mounted an adjustable head-board B'. This head-board is also connected at the rear portion of the binder-platform by means of a forked arm to the knotter-operating shaft. This head-board is adapted to be adjusted across the grain-platform, and is held at any desired point of adjustment by means of a stop or set-screw engaging the rod B. By this arrangement of the adjustable board the binder-platform may be made to conform to the varying lengths of grain, so as to present the middle portion of the grain to the cord and needle. This head-board also serves the additional purpose of protecting the gearing for driving the binder. The rear end of this grain-board is outwardly inclined to form a flaring or expanded surface at the rear end of the binder-platform to facilitate the discharging of the sheaf.

The driving-shaft F of the binding mechanism is mounted about centrally of the binding-platform in bearings provided for the same in or upon two or more of the longitudinal frame-timbers, as shown. This shaft extends into about the center of the binding-platform, and upon the end of which the crank-arm F', communicating motion to the compressors hereinafter described, is mounted. The opposite or outer end of this shaft extends beyond the longitudinal side timber, and is provided with a crank-arm, from which motion is communicated through suitable connecting rods and links to the needle, rear compressors, and ejectors, as hereinafter described. Just inside of this binder-frame timber the shaft has loosely mounted upon it a continuously-operated sprocket-wheel G, through which motion is communicated from a similar sprocket-wheel mounted on the axle of the master-wheel through a suitable sprocket-chain to the binding devices. Upon the binder-driving shaft just inside of the sprocket-wheel is mounted a collar G', rigidly secured to said shaft, and which collar is provided with a projecting arm $g$, forming a bearing for the pivot of a spring pawl or dog $G^2$ for engaging the teeth of a ratchet-wheel $G^3$, formed with or secured to the sprocket-wheel G, for locking the sprocket-wheel to the shaft. This pawl or dog is provided with an upper forward extension, made in hook or curved form, for engaging the end of a spring sliding bolt $G^4$, connected with and operated from a pivoted lever $G^5$, mounted upon the quadrant platform hereinafter referred to. The upper end of this dog or pawl is connected to the arm $g$ through a spring $g'$ in such a manner that said spring shall act to throw said upper end downward, and consequently the lower end upward, to engage the teeth of the ratchet-wheel $G^3$ when not held out by the action of the sliding spring-bolt $G^4$, above referred to, and when so held out by coming in contact therewith to leave the sprocket-wheel free to turn on the main shaft of the binder without driving the binding devices. The lever for operating this sliding bolt, as before stated, is mounted on the quadrant platform in such relation to the rake-standard as to be acted upon or vibrated at the proper time by the rake in delivering the grain. By this construction and arrangement of parts it will be seen that the ordinary spring-clutch for engaging the clutch-teeth of the driving-wheel is dispensed with, as also the cam employed for throwing the same out of engagement, and a simple sliding bolt entirely disconnected from the driving-shaft is made to accomplish all the requirements in a more certain and effective manner. It will also be seen by this arrangement of sliding bolt that the same is immediately returned to place after being withdrawn to permit the escape of the pivoted dog, so as to be ready to engage and throw the same out of action after one revolution of the wheel.

The front reciprocating grain compressor and gatherer, as before stated, is operated from the main binder-shaft in the following manner: In front of the main driving-shaft is mounted a shaft $F^3$, running parallel therewith and carrying an uprising arm $F^4$, which is connected to the compressor by means of a pitman $F^5$. This arm is also connected through a bent arm or link $F^6$ with the crank on the main driving-shaft.

The compressor H is composed of two or more upright bars $h\ h$, having their faces curved from their upper ends and connected together by means of a U-shaped plate $h'$ to permit the needle to pass up behind the compressed grain. This plate is also bolted to an upright plate H', provided on its upper end with a sleeve or collar $H^2$, which fits and is adapted to slide upon the brace-rod $D^3$, said brace-rod forming a track, way, or guide therefor. The sleeve or collar $H^2$ is provided with a projecting pin or stud $h^2$, to which the pitman-rod $F^5$, for reciprocating the compressor, is connected. The lower end of one of the arms $h$ is provided with a guiding or friction wheel $h^3$, adapted to run in a groove formed in the binding-platform. By this arrangement of parts it will be seen that a direct thrust is imparted to the upright lever and pitman, and from them to the front reciprocating compressor, by the driving-crank and in a direct line with the center of resistance in compressing the grain, and also that the pressure is increased as the same is carried forward to the binding devices. The tension device is also operated by the lever $F^4$ in the following manner: The binding-cord is held at one end, as hereinafter described, and passes through a flaring slit in a stationary cord-guide I, secured to the cross-bar D' of the binder-frame, and passes beneath the platform and through an eye of a spherical or cylindrical head $f$ on the end of the shaft $F^3$, upon which the rocking lever for operating the front reciprocating compressor is mounted, and which has a partial revolution imparted to it by the rocking movement of said lever to produce the tension upon the cord during the operation of binding, and to release the cord from tension upon the return or backward movement of the lever while the knot is being formed and the bundle ejected to permit the cord to pass freely through the eye $f'$ in a straight line. A knotter-shield and upper compressor J is pivoted to the front end or prongs of the stationary cord-guide I, and is slit at its rear end to allow the passage of the needle and cord, as hereinafter described, and has an unbroken surface at its front end to bear upon and compress the grain beneath it.

The knotter shield and compressor J is intermittently operated by a mutilated gear-wheel K, secured to the driving-shaft F, which imparts motion during a portion of its revolution to a pinion K', journaled to the frame of the machine. A delay-shoe $k$ on the pinion interlocking with the projecting smooth surface of the mutilated gear prevents the pinion from turning during the remainder of the revolution of the wheel K. This pinion-shaft $K^\times$ carries a crank-arm $K^2$, and is connected by a rod $K^3$ with the crank-arm $K^4$ on the knotter-shield and upper compressor rock-shaft $K^5$, secured by suitable bearings to the cross bar or rail D' at the rear end of the binder. A double-crank arm L is secured to the rock-shaft and connected at its front end by means of a link L' with the knotter-shield and upper compressor J and at its rear end by means of a link $L^2$ with a bow-shaped cord-depressor arm $L^4$, pivoted to a bracket $L^3$, secured to the cross bar or rail D' in such a manner that as the shield and compressor is raised and the sheaf is discharged the cord-depressor will be forced down to depress and hold the cord beneath the platform out of the way of the grain as it is raked from the harvester to and upon the binder-platform, as described. The shaft $K^x$ of the pinion for operating the knotter-shield and upper compressor is journaled at one end to the frame, and is supported by a bearing at its other end in a fixed cam or track M, secured by brackets to the outer rail of the frame, and said track also serves to shield the gearing and operate the rear compressor and ejector mechanism and to lock the needle in position when the knot is being formed, all as hereinafter described.

The needle N is keyed to a rock-shaft $N'$, arranged across the rear end of the binder-platform in such position that the point of the needle will pass through the slit in the rear end of the knotter-shield and upper compressor and immediately over and beyond the slit in the stationary cord-guide. The needle is limited in its downward movement, and is arrested and held when its point shall have passed below the surface of the binder-platform by a stop $N^2$ upon a collar fastened to the needle-shaft. The needle-shaft is intermittently operated during each binding operation, so as to have periods of rest, the first period of rest while the grain is being gathered by the reciprocating compressor, and subsequently when the knot is being tied, in the following manner: A stationary track M is secured by brackets $m$ $m$ to the side piece of the frame and is flattened on opposite sides to form delay-surfaces $m'$ $m^2$, over which a roller $n$, secured to the outer end of a crank $N^4$ on the main driving-shaft, may roll when the crank on the rod $N^5$, for connecting it with the needle-shaft, is passing the dead-centers and suspend its operation. This suspension of operation is effected by attaching the end of a connecting-rod $N^5$ to a crank-pin $n'$, secured to the free end of a link $n^2$, pivoted at $n^3$ to the end of the crank-arm $N^4$ and allowed to have a limited swinging movement by means of a slot in the end of the crank-arm below the pivot of the link $n^2$, through which the inner end of the crank-pin $n'$ passes, by which means the end of the connecting-rod is freed from pressure while the roller passes over the flattened or depressed portions of the track or cam, and is immediately brought into action again by the outward movement of the roller and swinging link $n^2$ when it resumes its position upon the cylindrical portion of the cam. It will be seen that a single revolution of the crank will serve to raise the needle to the knotter and return it to its normal position beneath the binder-platform.

The rear compressors O O and ejector-arms P P are both rigidly secured to a shaft $O'$, journaled in bearings on the upright posts D of the frame, that extends across the rear end of the binder-frame, and operate alternately to compress the grain and eject the sheaf by the rocking motion of the shaft. The rear compressors are made of spring-steel and have sufficient elasticity to yield should undue pressure be exerted upon them, and are not only intermittently vibrated to compress the grain and release the sheaf, but have an extra pressure exerted upon them when the grain is finally grasped by the needle to apply the band. These movements are effected by means of a short crank-arm $O^2$ on the needle-shaft $N'$, connected to crank $O^3$, secured to the end of the rear compressor and ejector shaft by means of a jointed rod formed of two links $O^4$ $O^5$, the lower one $O^5$ of which has a stop $O^6$ rigidly secured to it, whereby the links are allowed to vibrate in one direction only and are held stiff while receiving the thrust in operating the rock-shaft of the rear compressors and ejectors. When the binder is at rest and ready to receive the grain from the rakes, the jointed rod is folded, as shown in Figs. 1 and 3, and held down by the weight of the rods and cranks, as well as by a counterbalance-weight $O^7$ on the end of the crank-arm $O^3$. When the grain is forced against the rear compressors, an arm $O^8$ on the shaft $O'$ is intercepted by a spring locking dog or detent Q, that holds the compressors from further backward movement until the grain is bound and ready to be discharged from the machine. As the main shaft and reciprocating compressor continue to move the crank $O^2$ on the needle-shaft is gradually depressed until the lower arm of the jointed rod strikes the needle-shaft and is straightened out in line with the upper arm and held rigid while it receives the thrust from the forward movement of the needle-shaft crank-arm and raises the crank $O^3$ of the rear compressor and ejector rock-shaft $O'$ to release the sheaf and discharge it from the machine. When the forward movement of the crank has been nearly completed and the sheaf discharged from the machine, as shown in Fig. 12, the lower arm of the jointed rod comes in contact with a set-screw or adjustable trip $O^9$ or an extension arm or lug of the crank $O^2$ and is pressed forward to throw the coupling-pin of the jointed rods out of line with the crank-pins at the ends of the rods, and thus break the joint and allow the rear compressors and ejectors to fall to their normal position by means of the cranks, weights, and links, ready to receive the next delivery of grain. The ejector and rear compressor shaft is also tripped or receives a pressure to aid in breaking the joint of the jointed rod by a pin $l$ on the cord-depressor bracket $L^3$, that comes in contact with one of the spring-arms O of the rear compressors as the compressors are turned up and outward, and imparts an impulse to the shaft to insure its immediate and positive action.

In order that the spring-detent may be removed from beneath the arm $O^8$ on the end of the rear compressor rock-shaft to allow it to move backward to discharge the sheaf, the spring-detent is pushed back as the arm of the rock-shaft revolves by means of a pivoted lever Q', secured to one side of the bracket-plate and pressed against the lower end of the spring-detent by means of the spring-trigger Q², pivoted to the other side of the bracket Q³, the said trigger being operated upon or tripped by a lug N² on the needle-shaft. The spring-trigger is so constructed that the lug on the needle-shaft is free to pass forward beneath the trigger without tripping the pivoted lever until it returns in its backward movement, the said stop also serving to check or limit the movement of the needle-shaft by contact with the frame, as hereinbefore described.

The knotter is operated from the main driving-shaft by a mutilated beveled gear-wheel R, secured to the said shaft, that intermittently revolves an inclined shaft R' and through it a horizontal knotter-operating shaft R², secured in bearings to the cross-rail D' of the binder-frame by means of the beveled pinions $r$ $r'$ $r^2$ in a direct and positive manner. When the mutilated gear on the main shaft has revolved the inclined shaft and knotter-operating shaft a complete revolution, they are locked and prevented from revolving in either direction during the remainder of the revolution of the driving-shaft by means of a flattened face on the hub $r^3$ of the beveled pinion $r$, that is turned against the raised bearing-surface $r^4$ on the face of the beveled gear R, and is so held until the mutilated gear again intermeshes with the pinion and imparts to it another revolution. Upon the inner portion of the knotter-operating shaft is arranged a mutilated beveled gear R³, for giving a single revolution to a pinion $s$ upon the end of the knotter-spindle S during a partial revolution of the knotter-operating shaft, and also carries cams R⁴ R⁵, arranged on the shaft upon opposite sides of the beveled gear, the cam R⁵ serving to operate a reciprocating knife and the cam R⁴ serving to operate a cord-gripping device, and also to give a swinging motion to the lower or hinged portion of the revolving knotter to pull the cord through the loop and form and tighten the knot. The cord-gripper is formed in a peculiar manner, as shown in Fig. 22, and consists of a rubber roller T, arranged to press closely against and be indented by cogs or semicircular notches in the periphery of a roller T', into which grooves or notches the cord is placed and held by the pressure of the rubber roller against it. The surface contact of the rubber and notched rollers is such that one of the notches which holds the cord is always in line with the centers of the rollers and serves to firmly grip the cord between them. The rollers then remain stationary until the needle N encircles the bundle and places the cord carried by it between the rollers and across the next succeeding notch, when the rollers are immediately turned a sufficient distance to grasp and hold the cord deposited by the needle without dropping the end of the cord already held. The intermittent and limited movement is produced and timed by the cam R⁴ on the knotter-operating shaft that rocks a lever T², pivoted at T³ to the bracket T⁴, that supports the rollers T T', and has secured to its lower end a spring-pawl T⁵, that engages with the ratchet-wheel T⁶ on the face of the roller T', that is formed with the same number of teeth as there are notches in the roller T', and is moved one tooth at a time by each vibration of the lever. The inner face of the notched roller T' has secured to it a wheel T⁷, formed with square notches or teeth in its periphery, with which a square-nosed spring-pawl T⁸ engages at each movement of the roller by the positive action of the pawl T⁵ to prevent the accidental movement of the cord-rollers either backward or forward. When the needle is again brought forward in the formation of another sheaf, the cord-gripping rollers are given another movement that drops the stub end of the cord formed by cutting the preceding knot loose from the ends held in the holder and catches the cord presented by the second movement of the needle.

The knotter is formed of an upper spindle S, held at an angle with the knotter-operating shaft by a fixed sleeve S', secured by a bracket to the cross-rail D' of the frame, which forms a bearing for the knotter-spindle to revolve in. A beveled pinion $s$ on the upper end of the spindle S is revolved during a part of the revolution of the knotter-operating shaft R² by a mutilated beveled gear R³ on the shaft R², and is held stationary by a plate $s'$ on the hub of the pinion $s$, that abuts against a plate $s^2$ on the beveled gear R³ during the remainder of the revolution of the knotter-operating shaft. The lower spindle S² of the knotter is hinged at S³ to the lower end of the upper spindle, and is formed with a knotter-bill S⁴ on its lower end, so that the upper and lower spindles may revolve together and the lower or hinged spindle may be held in line with the upper spindle while the cord is wrapped around the hook or bill, and, after the bill has grasped the strands end of the cord leading to the holder, will be drawn backward by the cam R⁴, pivoted lever S⁵, and link S⁶ out of line with the upper spindle, as shown in Fig. 11, to pull the cord through the loop which lies around the hook or bill and form the knot. The cam R⁴ is a plain disk that holds the lever S⁵ and link S⁶ stationary on the lower or hinged spindle in line with the upper spindle while the toothed portion of the mutilated gear R³ acts upon the pinion $s$ to revolve the spindles, and is formed in a semicircular curve to rock the lever S⁵, the lower end of which is connected by a link S⁶ with a pin S⁷ on a collar S⁸ on the upper end of the hinged spindle S², and thereby draw the hinged spindle back to form the knot and release the hook, and then push the hinged spindle $S^2$ back in line with the upper spindle, ready to form the knot in the cord of the next band.

The knotter bill or hook is formed in a peculiar manner to firmly and securely hold the cord with but slight exertion or force. The bill or hook $S^4$ forms a fixed part of the hinged spindle $S^2$, and is slit or perforated to receive a pivoted jaw $S^9$ and yet leave a solid point at the end of the hook, below which the point of the jaw $S^9$ is depressed, thereby forming an unbroken link around the cord when the jaw is closed to prevent the possibility of the cord being removed until the jaw is opened. The jaw $S^9$ is pivoted at $S^{10}$ to the hook and is connected at its rear end to the lower end of a rod or bar $S^{11}$, that fits in a groove in the hinged spindle $S^2$. The upper end of the rod is secured by a pin $S^{12}$, that passes through a slit $S^{13}$ in the upper end of the hinged spindle $S^2$, and also through a collar $S^{14}$ on the spindle, the outer surface of which is formed with a spiral track or cam-surface $S^{15}$, over which a friction-roller $S^{16}$, journaled to a bracket on the fixed supporting-sleeve of the upper spindle, rolls when the cam and spindles are turned, by which means the cam $S^{15}$, pin $S^{12}$, and rod $S^{11}$ are depressed or moved endwise upon the spindle and the hinged jaw attached to the lower end of the rod is opened. This cam is so arranged and timed that the spindle and hook will have made one-half of its revolution and fairly looped the cord thereon before the jaw begins to open, and when the revolution of the hook is completed the jaw will have fully opened and received the cord outside of the loop and then quickly closed to hold the same when the cam has passed the roller and the cam $S^{15}$, collar $S^8$, and rod $S^{11}$ have been forced back to their original position by the pressure of the spiral spring arranged around the hinged spindle and between the collar $S^8$ and a projection of the hook $S^4$ on the lower end of the hinged spindle. The cord is then drawn through the loop lying around the hook by the backward movement of the hinged spindle and hook to complete and tighten the knot, which is released from the jaw or hook by means of a pin $S^{18}$ on the fixed sleeve $S'$, that presses on the cam-sleeve $S^{15}$, and through the rod $S^{11}$ opens the jaw $S^9$ as the hinged spindle and hook are drawn backward.

A cam $R^5$, similar in shape to the cam $R^4$, already described, is secured to the knotter-operating shaft and vibrates a lever U, pivoted to a bracket $T^4$, secured to the rail of the frame, and is slotted at its lower end $u$ to receive a pin $u'$, projecting from the end of the knife-bar $U'$, held in guides in the bracket $T^4$ and reciprocated by the vibrating lever U to cut the cord after the strands extending to the holder have been caught by the hook and while the hook is being drawn back to form and tighten the knot, so that the hook will simply pull against the severed ends of the cord and will not be subjected to unnecessary strain. The cord is held firmly by the cord-grippers T T' and in a slit in the bracket $T^4$ while it is being cut by the inclined blade $U^2$ of the knife $U'$, and the knife is pushed back to its normal position by the cam $R^5$ and lever U as the hinged spindle is pushed forward in line with the upper spindle, ready to perform another operation.

The guide and fender board E, hereinbefore referred to, is hinged to the rear end of the binder-platform in such position as to direct the grain past and in front of the cord and cord-depressor arm when it is in its raised position, and may drop flat toward the outer edge of the platform to allow the sheaf to be discharged therefrom by the pressure of the grain as it is being compressed to form a sheaf, and is raised into position again by means of a crank-arm $e$, secured to the fender-board and connected by a rod $E^2$ with the lower end of the rocking lever $E^3$, pivoted to the forward end of the frame, the upper end of which is operated by a swinging arm $E^4$, pivoted, preferably, to the standard $D^2$ and slotted at its lower end to receive a pin $e'$ on the end of the rocking lever $E^3$. The swinging arm is free to move forward to allow the fender-board to be depressed by the action of the grain, and after the sheaf is ejected a projecting finger $H^3$ on the front reciprocating compressor pushes against the swinging arm $E^4$ and forces it back, together with the rocking lever, thereby raising and holding the guide-board and fender in its proper position to receive the grain.

In operation the grain is swept upon the binder-platform by the revolving rake, and is guided past the cord-depressor arm by the hinged fender-board onto the platform, when it is arrested and evened up by the adjustable head-board and the middle portion of the grain brought directly in front of the binding-cord and needle. In this movement the rake-arm strikes the lever that withdraws the sliding spring-bolt and allows the spring-pawl to lock the continuously-revolving sprocket-wheel to the main shaft and make a single operation of the binder mechanism. The needle remains stationary while the friction-roller of the main driving-crank passes over the first delay-surface of the cam, and the front reciprocating compressor is in the meantime brought forward across the table, which releases the hinged fender-board. When the front reciprocating compressor shall have passed the point of the needle, the roller on the main driving-crank will have left the delay-surface of the stationary cam and the needle will begin to rise behind the grain and the knotter-shield and upper compressor will be drawn down to aid the front and rear compressors in forming the sheaf, and during compression of the gavel the needle will continue to rise until it passes the cord between the cord-grippers and the jointed rod shall have straightened out and completed the compression of the gavel and the lug upon the needle-shaft will have passed in front of the trigger for operating the spring-detent to allow the ejectors and rear compressors to operate in discharging the sheaf. The roller on the main driving-crank will then have reached the second delay-surface and the needle will be held motionless while the knotter-operating shaft makes a single revolution to wrap the cord around the hook. The cord-gripper in the meantime is moved a single notch to retain its hold upon the end of the cord, and also grasp the portion of the cord presented by the needle. Before the knotter-spindle shall have completed its revolution the cam-sleeve and rod will be forced down by the stationary friction-roller and the jaw of the hook will have been pressed completely open to catch the cord extending between the grippers and the hook, and then closed to hold and draw it through the loop to form the knot, the cord having been first cut between the knotter and cord-gripper, so that the knot can be readily tightened without undue strain upon the cord or knotter-hook. When the roller upon the main crank shall have passed the second delay-surface of the cam, the knot will have been tied, and the lug upon the needle-shaft will press against the trigger as the needle is retracted and push back the spring-detent that holds the ejector and compressor shaft, and will permit it to be rocked by the thrust of the hinged rod that has become rigid, so as to push the bound sheaf off the platform and away from the machine. When this movement has been effected, the main driving-shaft will have nearly completed its revolution and the adjustable trip on the crank of the needle-shaft will push the lower arm of the jointed rod and break the joint and permit the counterbalance-weight operating upon the arm of the rear compressors to fall with sufficient force to carry the finger upon the end of the ejector and rear compressor shaft past the spring-detent, which holds it in position to receive the grain. The lug upon the needle-shaft will at the completion of the revolution of the main shaft strike against the frame to prevent the further downward movement of the needle and the front reciprocating compressor-finger will have pushed back the swinging arm at the front end of the frame and lifted the hinged fender-board to place the binder in position to receive another delivery of grain.

The tongue of the machine is pivoted to the main frame of the master wheel, and is provided with projecting braces $w\ w'$, connected to said tongue, and also having a pivotal connection with the machine—the one $w$ at a point near the inner end of the cutting apparatus and the other $w'$ on the outer side of the main frame. This tongue is adapted to be made rigid when the binder is detached, and the machine used as a reaper by means of a sliding bolt $W'$, mounted on the main frame or at other convenient points, and in such manner as to engage a perforation in or upon the tongue. By this arrangement of hinged tongue it will be seen that the cutters may be tilted for picking up lodged grain by means of the ordinary rising and lowering lever without disturbing the relation of the binder-platform to the reaper-platform, and by which arrangement, also, it will be seen that the weight of the machine will be taken from off the necks of the horses, as the machine will be perfectly balanced on the master-wheel, grain-wheel, and swiveled platform-wheel, and that when the binder is detached and the machine used as a reaper by means of the bolt, as above described, the tongue can be made rigid and the cutters tilted in the ordinary way.

Having now described my invention, I claim—

1. The combination, with the binder-platform connected to the harvester-frame, of the bracket carrying the binder-supporting wheel, having a swivel-connection at its forward end with the binder-platform, and adapted to support or carry the weight of the platform at its rear end at a point over the axle of said wheel, substantially as described.

2. The beveled or inclined circular plate connected to the binder-platform, substantially as described, combined with and to form a level track for the swivel-bracket carrying the supporting-wheel, as and for the purpose set forth.

3. The combination, substantially as hereinbefore set forth, of the sprocket-wheel having the ratchet-teeth formed upon the hub thereof and mounted loosely on the driving-shaft, the pivoted rocking spring locking-dog carried by the shaft and adapted to engage at one end the teeth on the hub of the sprocket-wheel, and a sliding trip operated from the rake-arm, adapted to be struck by and hold the locking-dog out of engagement with the ratchet-teeth, as set forth.

4. The pivoted guide or fender board located between the reaper-platform and needle-arm for directing and guiding the grain past the cord, in combination with mechanism for imparting a swinging movement thereto, as and for the purpose described.

5. The pivoted fender arranged substantially as described, in combination with the front reciprocating compressor for operating the same, as set forth.

6. The pivoted fender having a swinging movement imparted thereto by mechanism operated by the front reciprocating compressor upon the return or backward movement of the same, combined with said compressor and the ejectors and so timed with the ejectors as to fall or be moved out of the way to permit the discharge of the grain and to be moved or raised into place upon the discharge thereof, as set forth.

7. The grain board or fender for arresting and evening up the grain, provided with the sleeve for engaging the rod or bar, adapting the board to be moved or adjusted upon the binder-platform, substantially as and for the purpose set forth.

8. The combination, with the binder-platform, of the grain board or fender connected at one end to a guide-rod on the binder-platform through the sliding sleeve and at the other end by means of a forked arm or brace engaging a rod or shaft parallel with the guide-rod for adapting the board to be adjusted upon the platform, substantially as and for the purpose set forth.

9. The tension device made in spherical or cylindrical form and having an eye centrally therethrough, and mounted upon and having a partial revolution imparted thereto by means of the operating-shaft of the front reciprocating compressor-lever, as set forth.

10. The combination, substantially as hereinbefore set forth, of the crank-arm on the main driving-shaft, the upright rocking lever, the rod or link, and the pitman connecting the same, arranged in the same plane, or nearly so, for bringing the thrust of the operating-levers on a direct line with the center of resistance in compressing the grain, as described.

11. The combination, substantially as hereinbefore set forth, of the crank-arm on the main driving-shaft, the upright rocking lever, the rod or link connecting the same, and the stay rod or brace forming the guide or track for the compressor and gatherer, all arranged in a vertical plane, or nearly so, for imparting a direct thrust to said compressor and gatherer on a line with the center of resistance, as set forth.

12. The combination, with the stationary cord-guide, of the combined pivoted knotter-shield and upper compressor, substantially as and for the purpose set forth.

13. The combined knotter-shield and upper compressor pivoted in front of the knotter, in combination with a crank-arm for moving said shield forward and downward to compress the grain, substantially as described.

14. The combination, with the cord-holder and needle, of a cord-depressing arm for depressing and holding the cord in position to receive the grain, as set forth.

15. The combination, with the double crank or rocking arm, of the combined pivoted knotter-shield and upper compressor and the cord-depressing arm, substantially as and for the purpose set forth.

16. The combination, with the double crank or rocking arm, the upper compressor, and the cord-depressor, of the shaft to which the double crank or rocking arm for operating the upper compressor and cord-depressing arm are attached, and the pinion and connecting-rod for operating the same, substantially as described.

17. The combination of the fixed cam or track connected to the binder-frame with the shaft and the pinion that operate the knotter-shield-actuating mechanism, located and arranged so as to form a bearing for the shaft, substantially as described.

18. The combination of the compressor-shaft provided with the stop-arm and the needle-shaft provided with the projecting lug for releasing or operating the spring locking dog or detent which acts on the stop-arm to prevent the compressor from rocking and serving to hold or lock the needle-shaft in its position of rest, substantially as and for the purpose described.

19. The stationary cam secured to the frame of the binder and provided with a camway, combined with and adapted for controlling the movements of the needle-shaft-operating mechanism, substantially as described.

20. The combination of the needle, the main crank for driving the needle, provided with the slotted end, and the needle-driving rod connected therewith through the swinging arm, pivoted on the main crank, and adapted to engage the stationary cam through a friction-wheel, substantially as described.

21. The stationary cam secured to the frame of the binder, provided with the camway, combined with the crank on the main binder-shaft, provided with the slotted end, the needle-driving rod connected to said crank-arm by means of the swinging arm and having a pin or stud project through the slotted end of the crank on the main shaft to engage the camway, substantially as set forth.

22. The combination, with the rear compressor and ejector shaft, of the jointed rod for connecting the same with the needle-operating crank, substantially as and for the purpose set forth.

23. The combination of the needle-shaft with the rear compressor and ejector shaft provided with the weighted crank-arm, and the jointed rod connecting said shaft with the needle-operating crank, substantially as described.

24. The combination, with the needle-shaft, of the rear compressor and ejector shaft connected with and operated from the projecting crank-arm on the needle-shaft through the jointed locking connecting-rod, and the adjustable trip on the crank of the needle-shaft for breaking the lock, substantially as and for the purpose set forth.

25. The combination of the needle-shaft with the rear compressor and ejector shaft connected to and operated by the needle-operating shaft through the jointed locking connecting-rod, the adjustable trip on the crank of the needle-shaft for breaking the lock, and the weighted crank-arm on the compressor and ejector shaft, substantially as and for the purpose set forth.

26. The knotter-bill having the slit or oblong perforation formed therein, in combination with the jaw or cord-holder pivoted within and adapted to move through said slit, substantially as and for the purpose described.

27. The combination, substantially as hereinbefore set forth, of a slitted knotter-bill, a pivoted jaw mounted and adapted to move therein, and the operating rod or bar mounted within the slotted knotter-shaft, as and for the purpose described.

28. A knotter having its shaft jointed and adapted to have a revolving motion to form the loop, the joint adapting the knotter to swing on its joint or pivot to draw the cord through the loop and discharge the knot therefrom, substantially as described.

29. A jointed knotter-shaft, in combination with means, substantially as described, for imparting both a revolving and swinging movement to the knotter, as set forth.

30. The combination, substantially as hereinbefore set forth, of the revoluble jointed knotter-shaft, the joint adapting the knotter to have a swinging movement imparted thereto to form and release the knot, and a reciprocating knife adapted to move or cut in an opposite direction to the swinging motion of the knotter to sever or cut the cord, as described.

31. The inclined jointed knotter-shaft, the joint adapting the knotter to have a swinging movement across the slot of the cord-guide in drawing the ends of the cord through the loop and discharging the knot, as described.

32. The pivoted lever connected at one end with the operating cam-disk on the knotter-operating shaft through the notched or forked end and with the collar on the knotter-shaft through the link, and a pin or stud formed therewith, substantially as and for the purpose set forth.

33. The cam on the knotter-operating shaft, combined with means connecting it with the knotter and cord-holder, whereby a swinging movement is given to the knotter and the cord-holder is operated.

34. The combination, substantially as hereinbefore set forth, of the cord-gripper disks or wheels, the ratchet-disk for imparting motion thereto, the holding disk or wheel provided with the square or straight faced teeth, and the dog or pawl for engaging the teeth of the holding-disk and locking the cord-holder in both directions, as described.

35. The combination of the knotter, the knife, and their operating-shaft, and the cams arranged upon the shaft on opposite sides of the knotter for reciprocating the knife and imparting a positive swinging movement to the knotter-shaft, as set forth.

36. The combination, with the knotter-operating shaft for imparting the rotary and swinging motion to the knotter, of the segmental gear for revolving the knotter, provided with a delay-surface for holding the knotter in its position of rest to receive the cord from the needle-arm, as described.

37. The combination, with the knotter-operating shaft and segmental gear for imparting a revolving motion to the knotter, and the cams for imparting the swinging motion to the knotter and operating the cord-gripper and knife through the arms or levers, as described.

38. The combination, with the main frame and the detachable binder-frame, of the tongue pivoted to the main frame and having the locking-bolt for holding the same rigid with said main frame when desired, substantially as and for the purpose set forth.

MARION L. NICHOLS.

Witnesses:
WM. H. ROWE,
JNO. R. YOUNG.